July 27, 1965 J. A. FELTS 3,197,751
FLYING MAGNETIC HEAD ASSEMBLY
Filed Dec. 18, 1963
FIG. 1.
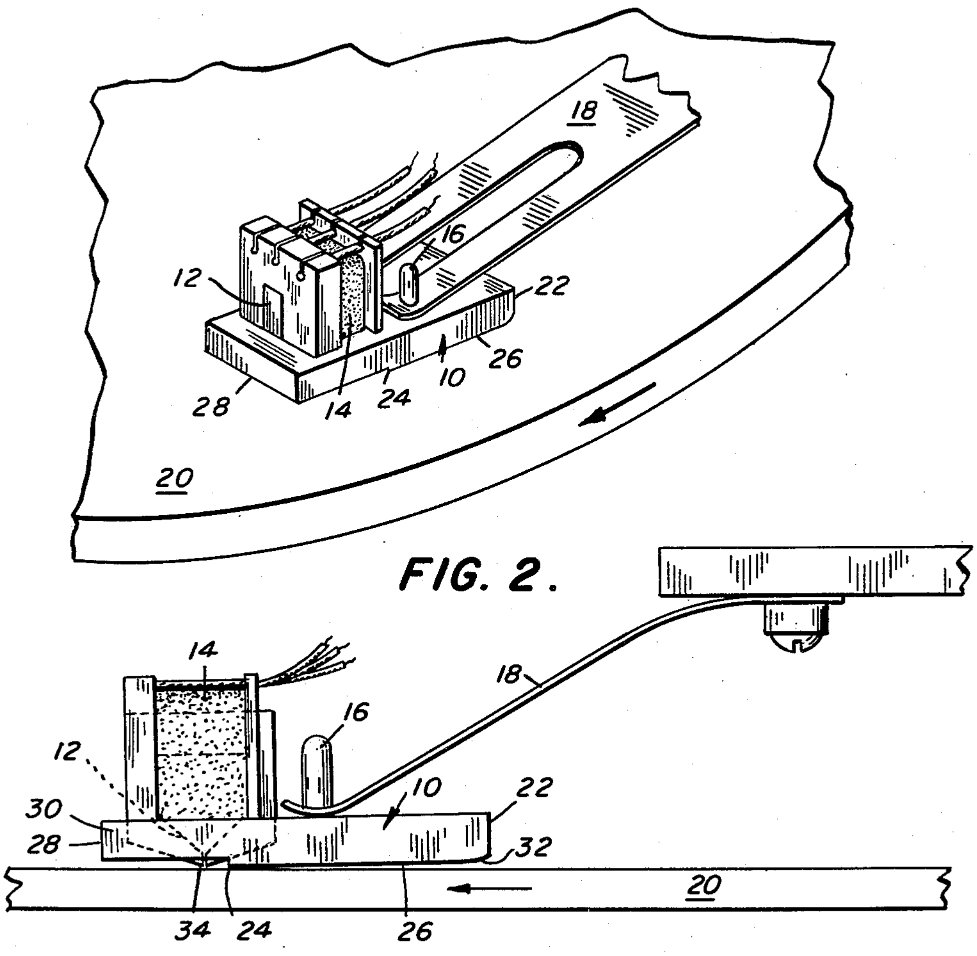
FIG. 1, FIG. 2.
FIG. 3.
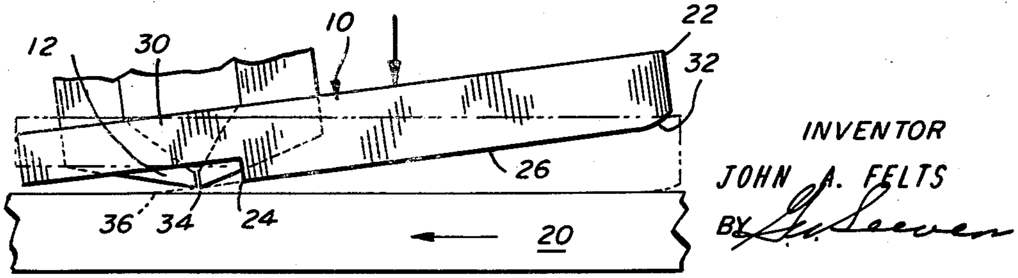
INVENTOR
JOHN A. FELTS
BY G. Seeven
ATTORNEY

United States Patent Office 3,197,751
Patented July 27, 1965

3,197,751
FLYING MAGNETIC HEAD ASSEMBLY
John A. Felts, Los Angeles, Calif., assignor to General Precision, Inc., a corporation of Delaware
Filed Dec. 18, 1963, Ser. No. 331,509
4 Claims. (Cl. 340—174.1)

This invention relates to electromagnetic recording, and more particularly to a new and improved gas lubricated recording transducer assembly which positions the recording gap of the recording head extremely close to the moving magnetic recording surface without physically contacting the surface.

Electromagnetic recording is used extensively in data storage for digital computing systems. Data may be recorded and stored for future use on tapes, drums, or disks, which have been coated with a thin magnetic film that retains coded information pulses that have been recorded thereon by an electromagnetic recording head.

In order for a recording head to impress a signal upon the recording medium with a minimum of recording current, in order to obtain a maximum readout signal from the recording medium, and also in order to obtain a high packing density of information on the recording medium, thereby increasing the memory capacity and computing speed capabilities, it is well known that the gap of the recording head must be in physical contact or in very close proximity to the recording medium. While physical contact of the head is most desirable for optimum recording, it is objectionable from a mechanical standpoint, since continual friction between the recording head and the recording medium will cause excessive wear and damage to the recording head and the recording medium. It is therefore highly desirable to position the recording gap in very close proximity to the surface of the recording medium.

In the case of recording disks, it is practically impossible to construct a disk without wobble. A disk may be perfectly machined and the recording heads may be perfectly adjusted so that they are in very close proximity to the recording surface, but a misalignment may occur from a slight shock or vibration that will cause the rotating shaft of the disk to be very slightly bent, resulting in a wobble of the surface of the disk, especially the surface nearer the periphery. Therefore, in order to maintain a recording head in very close proximity to the surface of a rotating memory disk, the head should be constructed so that it will comply with the wobble of the disk. If this is not done, the spacing between the head and the recording surface of the disk may be excessive at one point in the rotation of the disk and may make actual contact with the recording surface at another point on the rotating disk.

Novel head mountings have been developed in which the recording head is mounted in a bearing pad, or shoe, that rides or flies on a thin air film between the recording head and the surface of the rotating disk. One such head mountings is described in Patent Number 3,177,495, issued to J. A. Felts on April 6, 1965. These flying head mountings succeed in placing the recording or air gap section of the recording head in very close proximity to the surface of recording disk. Unfortunately, the portion of the air film within approximately 50 microinches of the disk surface is relatively impenetrable, so that it is impossible for a recording head that is mounted in a pivoted bearing pad to be positioned closer to the recording surface of the rotating disk without causing failure of the supporting air film and making an actual physical contact, which will result in damage to the recording head and destruction of the recording medium on the disk surface.

The present invention provides an air film supported recording head assembly comprising a bearing pad adapted to fly on a thin air film moving with the moving recording surface. The recording head is mounted behind the lagging edge of the bearing pad and is positioned so that it penetrates the air film to within about 5 microinches from the disk surface and maintains this position relative to the moving disk irrespective of moderate amounts of wobble of the disk and of moderate variations of angle of attack between the bearing pad and the disk surface.

The principal object, therefore, is to provide a magnetic recording head assembly that will automatically position the recording head in extremely close proximity to the surface of a moving recording medium, irrespective of moderate amounts of wobble or run-out of the recording medium.

Another object is to provide an air film supported recording head assembly that will maintain the recording head in very close proximity to a moving recording medium, irrespective of moderate variations of the angle of attack between the bearing pad of the recording head assembly and the surface of the recording medium.

In the drawings, which illustrate one embodiment of the invention:

FIGURE 1 is a perspective view of the recording head assembly;

FIGURE 2 is an elevation view of the recording assembly, the recording medium, and the supporting means for the recording assembly;

FIGURE 3 is a partial elevation view of FIGURE 2 which is provided in order to simplify the explanation of the operation of the invention.

As illustrated in FIGURE 1, the recording head assembly is comprised of a shoe 10, in which is mounted a recording head 12 with its associated excitation winding 14. The top surface of shoe 10 has a flat rectangular configuration, and in this particular embodiment is made of aluminum alloy having the dimensions of 0.50 inch in length, 0.22 inch in width, and 0.058 inch in maximum thickness. Positioned in the top surface of shoe 10 and spaced equidistant from the longitudinal center line are a pair of positioning pins 16 which are adapted to receive bifurcated positioning spring 18 which is used to properly position and maintain the head assembly against the surface of recording disk 20. Positioning pins 16 are located at a distance of 0.220 inch from the leading edge 22 of shoe 10.

The lower surface of shoe 10 is provided wth a step 24 which is approximately 0.004 inch in height and is located a distance of 0.330 inch from the leading edge 22 of shoe 10. The surface between step 24 and leading edge 22 is the bearing pad 26 which causes the recording head assembly to fly from the surface of recording disk 20. Step 24 thus becomes the lagging edge 24 of bearing pad 26. The portion of the bottom surface of shoe 10 between step 24 and the lagging edge 28 of shoe 10 is designated as a head support section 30 and is used solely to support recording head 12, excitation winding 14 and their associated supporting members. Since head section 30 is only for the support of these components, its physical dimension is not important; however, in the present embodiment the length of section 30 between step 24 and lagging edge 28 is 0.17 inch.

As illustrated in FIGURE 2, recording head 12 extends through a slot in head support section 30 so that the recording tip, or air gap 34 of head 12, is flush with bearing pad 26. Air gap 34 is positioned a distance of 0.030 inch toward the lagging edge 28 of shoe 10 from step 24.

The intersection of the leading edge 22 and bearing pad 26 may be rounded or bevelled to provide a "ski nose" 32, which, in the embodiment described herein, has a dimension of 0.001 inch along the leading edge 22 and 0.020 inch along the forward edge of bearing pad 26. "Ski nose" 32 does not appreciably affect the operation of bearing pad 26 except when recording disk 20 is operating at a very low rotational speed during starting or stopping.

*Operation*

When recording disk 20 is at rest, bearing pad 26 of shoe 10 is in physical contact with the recording surface of disk 20, as illustrated by the phantom outline in FIGURE 3. In this position recording head 12 may make physical contact with the recording surface of disk 23. When recording disk 20 is operating at normal operating speeds, shoe 10 may assume the attitude as indicated by the solid outline, as shown in FIGURE 3. In this position recording head 12 has risen a very slight amount on the recording surface of disk 20. It can be seen from FIGURE 3 that a line extending from bearing pad 26 of the assembly in operation will intersect with a line extending from the bearing pad of the assembly while inoperative at an imaginary intercept point 36. If recording tip 34 of recording head 12 were positioned at intercept point 36, it would make physical contact with the recording surface of the recording disk 20 at all times. Since it is necessary that recording tip 34 be removed a very slight amount from the recording surface of disk 20, it must be positioned slightly forward of intercept point 36.

For the purpose of explaining the operation of the particular embodiment of this invention, intercept point 36 may be considered to be a fixed point on the surface of disk 20. Theoretically, the intercept point 36 is fixed only when the medium between the bearing pad and the rotating recording surface is incompressible in which case the angles of attack of the bearing pad are proportional to the downward force exerted by bifurcated spring 18. If, however, the force exerted by spring 18 becomes excessive, the wedge of air between the bearing pad and the recording medium becomes a compressible medium, intercept point 36 recedes away from lagging edge 24 and ceases to become a fixed point on the surface of the recording medium, and lines extending along the bottom surface of bearing pad 26 become a loci of intercepts above the surface of the recording medium. In the limit of this condition the altitude of the bearing pad may become unstable, and the excessive downward force exerted by bifurcated spring 18 may actually collapse the wedge of air between the bearing pad and the disk surface so that the bearing pad will be forced into actual physical contact with the recording medium. A theoretical treatise on this phenomena may be found in the book by W. A. Gross, "Gas Film Lubrication," John Wiley and Sons, Inc., 1962, Library of Congress Catalog number: 62–15176. This publication also very thoroughly discusses the various effects of loading a gas bearing, positions of loading, variations in the dimensions of the bearing pad, etc.

Heretofore, in designing air film supported recording head assemblies, such as that described in the aforementioned Patent Number 3,177,495 in which the recording head is inserted into the bearing pad, it has been necessary that bearing pad 26 be positioned in very close proximity to the recording surface of disk 20. In order to accomplish this, it has been necessary to exert considerable force against the shoe by the use of a loading spring, such as spring 18. In the present invention the proximity of bearing pad 26 to the surface of disk 20 is much less critical since recording head 12 is not positioned within bearing pad 26, but is positioned near intercept point 36. Therefore, the amount of force exerted by bifurcated spring 18 is less critical. In the particular embodiment described, it has been found that spring 18 may exert the force of between 6 and 20 grams against head 10 without changing the electrical performance of recording head 12. Since there is an obvious variation in force of over 300%, it is not necessary to provide force adjustment devices that have heretofore been required to accurately adjust the force of spring 18 against shoe 10.

In the actual operation of the particular embodiment described, the angle of attack between bearing pad 26 and the surface of disk 20 is approximately eight minutes when disk 20 has velocity of approximately 2,000 inches per second. It has been found that by providing ski nose 32 to the leading edge 22 of shoe 10, bearing pad 26 lifts and assumes this angle of attack when disk 20 reaches a velocity of only approximately 100 inches per second. The effect of the ski nose thus materially decreases the amount of wear between bearing pad 26 and the surface of disk 20, since it permits an air film to develop between these two surfaces at a very low disk speed. It is obvious that an excessive force exerted by spring 18 against shoe 10 would prevent bearing pad 26 from flying at very low disk speeds. It is therefore desirable that a comparatively low force be exerted by spring 18 in order to prevent excessive friction, and time in contact, between bearing pad 26 and the recording surface of the disk 20.

While the embodiment described consists of a shoe having a single recording head, it is possible to construct a wide shoe in which several recording heads are mounted. It has been found, however, that a bearing pad that has a width much greater than its length has much less leakage, and therefore develops a much greater lift per unit area. It thus requires an exceedingly high force from a positioning spring, such as bifurcated spring 18, to maintain it in reasonably close proximity to the surface of the recording disk. This excessive force may cause extreme wear between the bearing pad and disk surface until such time as the air film is developed between these two surfaces. It was found that one such pad having a width of approximately three inches and containing sixteen recording heads required a positioning spring force of six pounds to maintain the assembly in a proper attitude with respect to a rotating disk. While this particular head assembly may operate properly from a standpoint of magnetic recording, it places an excessive physical pressure between the bearing pad and disk surface which results in excessive wear at low disk speeds and until the air film is formed between the bearing pad and disk surface. Another disadvantage of this configuration is that an exceedingly rigid bearing pad and head support section is required so that all of the recording heads are maintained in proper proximity to the recording surface. If any slight flexibility of these members is permitted, the force of the air wedge or film between the bearing pad and recording disk will deflect any portion of the shoe assembly that is not retained by the positioning spring. This results in the improper attitude of all of the recording heads and inaccurate and faulty magnetic recording.

In order to produce a multiple head assembly that requires reasonable positioning spring force and a head support section that is not subjected to deflection, it is necessary to remove the bearing pad from the portion of the head assembly that is not supported by the positioning spring. The resulting structure, therefore, effectively becomes a pair of spaced bearing pads, as in the particular embodiment described, that is bridged with a head support section containing several recording heads.

It is therefore obvious that the recording head assembly described herein is a preferred embodiment of the invention and that many variations may be made without departing from the spirit of the invention.

I claim:

1. A transducer assembly adapted for operation in gas-lubricated relationship with a magnetizable surface moving in relation thereto, comprising:

(A) A shoe having a bearing pad with leading and lagging edges oppositely disposed with respect to the direction of movement of said surface, and a head support section adjacent the lagging edge of said bearing pad and positioned with respect to said pad so as to be more distantly spaced from said surface with respect to said bearing pad;

(B) A recording head carried by said support section and having pole pieces presenting a gap, said gap being positioned rearwardly of said lagging edge; and (C) Means for tiltably mounting said shoe whereby the leading edge of said bearing pad may, in operating relationship with said magnetic surface, assume a position further from said surface than the lagging edge thereof.

2. A transducer assembly according to claim 1 in which the gap presented by said pole piece is initially disposed at substantially the same distance from said surface as said bearing pad whereby said gap assumes a position closer to said surface than the lagging edge of said pad when the leading edge thereof moves away from said surface.

3. A transducer assembly according to claim 1 in which said means for tiltably mounting said shoe comprises:

(A) A pair of positioning pins extending from the surface of said shoe opposite said bearing pad, (B) Means for mounting said shoe on a frame element, and (C) A positioning spring coupled between said mounting means and said positioning pins.

4. A transducer assembly according to claim 1 in which said bearing pad is provided with a ski nose at the leading edge thereof.

No references cited.

IRVING L. SRAGOW, *Primary Examiner.*

WALTER W. BURNS, Jr., *Examiner.*